United States Patent [19]

Malik

[11] Patent Number: 5,768,796
[45] Date of Patent: Jun. 23, 1998

[54] GAGE FOR MEASURING LENGTH OF FLEXIBLE EXTRUSIONS

[75] Inventor: Richard Malik, Rossford, Ohio

[73] Assignee: Cooper Tire & Rubber Company, Findlay, Ohio

[21] Appl. No.: 738,800

[22] Filed: Oct. 28, 1996

[51] Int. Cl.[6] .................................................... G01B 5/02
[52] U.S. Cl. ................................. 33/712; 33/489; 33/553; 492/11
[58] Field of Search ............................ 33/712, 484, 485, 33/489, 832, 833, 549, 783, 803, 805, 806, 810, 811, 551, 552, 553, 554, 555; 492/9, 11

[56] References Cited

U.S. PATENT DOCUMENTS

| | | | |
|---|---|---|---|
| 2,835,037 | 5/1958 | Middents | 33/485 |
| 3,328,885 | 7/1967 | Frindel | 33/551 |
| 4,604,813 | 8/1986 | Kawanami et al. | 33/549 |
| 4,939,849 | 7/1990 | Johnson | 33/712 |
| 5,024,002 | 6/1991 | Possati | 33/552 |
| 5,097,617 | 3/1992 | Craven | 33/485 |

FOREIGN PATENT DOCUMENTS

| | | | |
|---|---|---|---|
| 0261106 | 10/1988 | Japan | 33/712 |

*Primary Examiner*—Daniel G. DePumpo
*Attorney, Agent, or Firm*—Joseph G. Nauman

[57] ABSTRACT

A roller measurement fixture is comprised of a series of small in-line rollers mounted in one or more rows, forming a receiving cradle device. An extruded part to be measured is cradled in a semi-circular arrangement of the rollers and straightens as it settles under its own weight. The cradle device will accommodate many different cross-sections of extruded seal. The rollers are free to rotate as the part is placed into the fixture and properly located. Friction front these rollers is negligible, therefore the part remains in, or attains, its free state, without internal stresses, throughout the loading and measurement process. Thus, the extruded part is limp within the cradle, being loaded so as to contact a head or alignment stop at one end of the cradle. A floating stop riding on the rollers engages the other end of the part and cooperates with a scale on the cradle as a means of acquiring the measurements.

3 Claims, 2 Drawing Sheets

GAGE FOR MEASURING LENGTH OF FLEXIBLE EXTRUSIONS

BACKGROUND OF THE INVENTION

Accurate length measurements of extruded rubber seals are required for production control data collection, capability studies, and shrinkage studies. These seals are long flexible extruded parts having a variety of crosssectional configurations, generally in length up to twenty feet or more. After extrusion, the seals are placed onto a measurement fixture, and an overall length measurement is recorded.

One of the problems with accurately measuring the overall length of such extruded rubber seals is the variation caused by handling the part. Typically, one end of a long part is placed against an end stop in the measurement fixture (such as an aluminum angle or channel, or on a flat wooden boundary board with attached scale) and straightened to extend to its full length where a measurement is recorded. Errors in length measurement will occur if the part is not perfectly straight on the fixture.

Another major contributor to errors in measurement is the stretching or compressing (stuffing) of the extruded part while placing it into the measurement fixture. This can create localized tension or compression forces in the extrusion. The coefficient of friction between the typical measurement fixture and the various rubber compounds is high enough to allow a stretched or stuffed part to remain in that altered state, e.g. such localized forces are not dissipated, while the part is being measured. If a part is not in its "free state" (not stretched or stuffed) when measured, variations and measurement errors will result.

SUMMARY OF THE INVENTION

A novel roller measurement fixture has been designed, according to the invention, to help eliminate both of the problems mentioned above. The fixture is composed of a series of small in-line rollers mounted in one or more rows, forming a receiving cradle device, such that the extruded part to be measured is cradled in a semi-circular arrangement and straightened as it settles under its own weight. The semi-circular cradle device will accommodate many different cross-sections of extruded seal. The fixture also contains a stainless steel scale that is used as a means of acquiring the measurements.

The cradle is preferably comprised of a series of rows of in-line rollers which are free to rotate as the part is placed into the fixture and properly located. The friction from these rollers is negligible, therefore the part remains in, or attains, its free state, without internal stresses, throughout the loading and measurement process. Thus, it can be characterized that the extruded part is limp within the cradle, being loaded so as to contact a head or alignment stop at one end of the cradle.

A floating end stop with an integral pointer rides in or along the part cradle, and is used to rest against the free end of the part to indicate the measurement on the scale attached to the fixture cradle.

The primary object of the invention, therefore, is to provide a method and apparatus by which the length of long flexible extruded parts can be measured accurately by first supporting the part at a large number of incremental locations along its length, each support being movable relative to the adjacent surfaces of the part so as to allow the part to straighten and to relax and dissipate any localized tension or compression forces in the part prior to taking the length measurement.

Other objects and advantages of the invention will be apparent from the following description, the accompanying drawings and the appended claims.

DESCRIPTION OF THE PREFERRED

Figure 1:
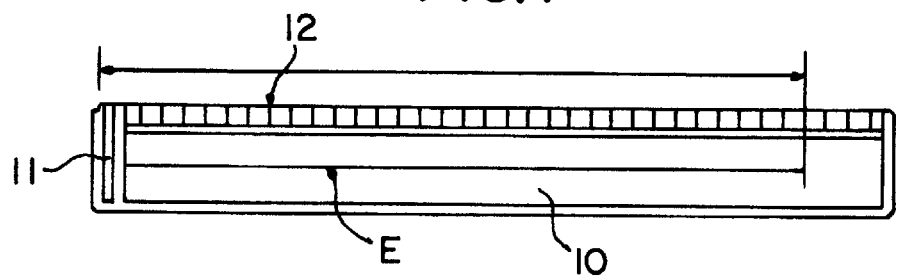
FIGS. 1 and 2 are schematic diagrams of prior art measurement devices.

FIG. 1 illustrates schematically the prior manner of measuring long flexible rubber (or the like) extrusions. Of particular interest are synthetic material extrusions used for weather stripping and sealing in automotive applications, such as around windows, in windows runs or channels, and around doors and trunk lids. These seals are extruded through a die to achieve the desired crosssectional configuration, which is usually irregular, and cut to prescribed length.

Figure 2:
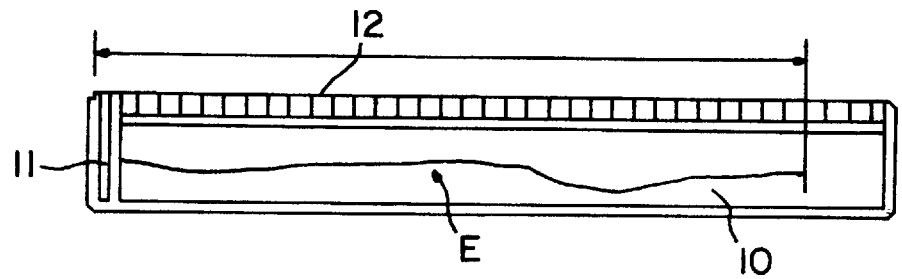
Figure 3:
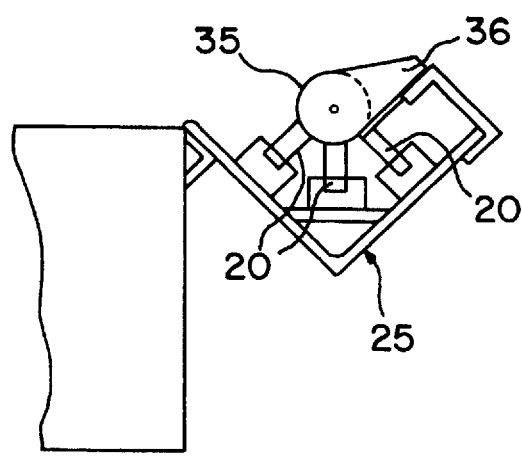
FIG. 3 is an end view of the measuring device, typically installed at the delivery end of an extrusion apparatus.

Inspection of these extruded parts, particularly length measurement, is required to maintain uniformity and quality. Proper length is needed to avoid problems of installation on production lines. Both short and long extrusions present difficulties to the installer, who is working under time constraint. The cut parts E (lengths) are placed on a flat board 10 (FIGS. 1 and 2), one end against a stop 11, and the length is noted on a rule 12 attached to the board. These parts are flexible and relatively small in cross-section and comparably quite long; for example, a particular extruded seal might be 1.5 inches across its greatest cross-section, up to twenty feet or more in length. The material is often spongelike and in any event is easily subject to localized compression or tension as the part is manually laid out on board 10.

The coefficient of friction between the part and the board can result in internal localized stress (either compression or tension) which affects the true length (when relaxed) of the part. Also, the part may be (hurriedly) not laid in a straight line, as illustrated in an exaggerated way in FIG. 2. All of these variations, caused in part by haste during the manufacturing operation, may result in parts of incorrect length measurement.

In accordance with the invention, a novel roller measurement fixture is provided to help eliminate both of the problems mentioned above. The fixture is comprised of a series of small in-line rollers 20 supported on small shafts 22 aligned in one or more rows 20A, 20B, 20C, within a trough 25 which is an open beam 26 having legs 27A, 27B preferably at right angles to each other, with a small shelf 28 secured across its bottom, at the joinder of the legs 27A, 27B forming a receiving cradle device. The cradle is preferably comprised of the three (or more) rows 20A, 20B, 20C of in-line rollers 20 each of which are free to rotate on their respective support shafts 22 as the part is placed into the fixture through its open top and properly located. The shafts are all mounted to extend transverse to the beam 27, so the roller peripheries provide a large number of independent supports for the part. The friction from these rollers is negligible, therefore the part remains in, or attains, its free state, without internal stresses, throughout the loading and measurement process.

Other forms and arrangements of rollers can be used. For example, the rollers can be a single set, each having a large convex peripheral configuration, or a larger number of rows of smaller rollers can be used. In an actual embodiment, three rows of rollers having a diameter of one inch, and with their centers spaced apart 9/16 of an inch. The rows extend along a cradle beam twenty feet in length.

Figure 4:
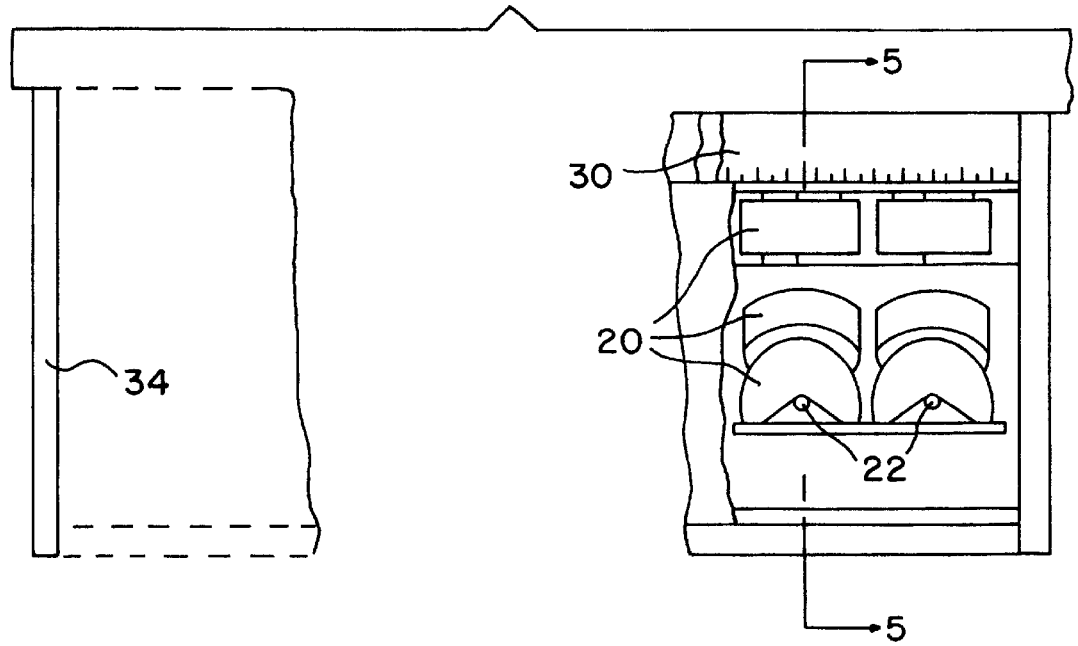
FIG. 4 is an enlarged and broken partial front view of the cradle.

Thus, it can be characterized that the extruded part is limp within the cradle, and the extruded part to be measured is placed and held by gravity, cradled in a semi-circular arrangement (see FIG. 4) and will straighten as it settles under its own weight. Any tension or compression forces temporarily created in the part during handling will be relieved or dissipated, since each roller can move independently of the others, and each provides an incremental support of the part over a very short portion of its total length. The semi-circular cradle device will accommodate many different cross-sections of extruded seal.

Figure 5:
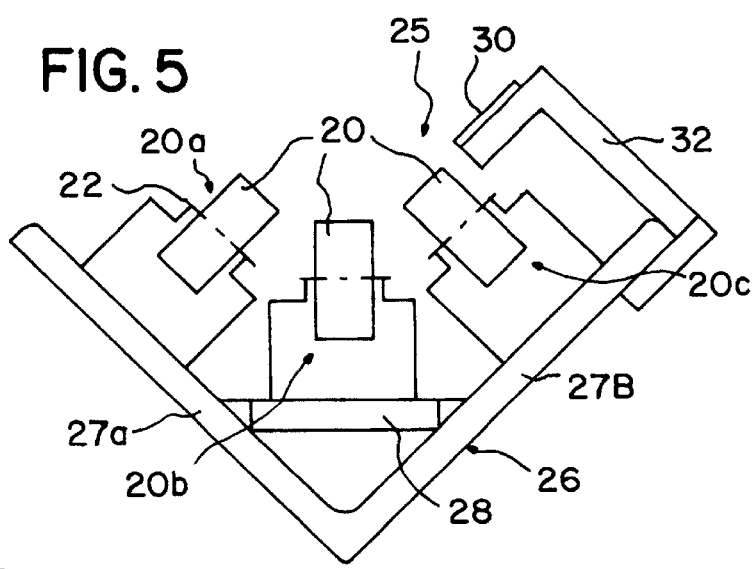
FIG. 5 is an enlarged cross-sectional view of the cradle and the rollers, taken along line 6--6 in FIG. 5.
Figure 6:
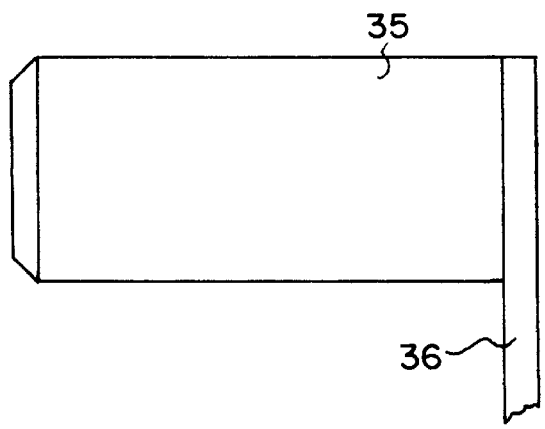
FIG. 6 is a plan view of the floating end stop.
Figure 7:
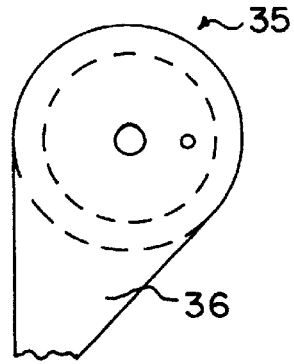
FIG. 7 is an end view of the floating end stop.

The fixture includes a stainless steel scale 30 supported on a U-shaped member 32 which is fastened to, and runs the length of leg 27B of beam 27, the scale being used as a means of acquiring the length measurements. The zero point of the scale aligned with an end stop 34 at the head end of the fixture. A floating end stop 35 (see FIGS. 5 and 6) with an integral pointer 36 rides in and along the part cradle, being cylindrical in shape and simply slidably supported on rollers 20, This stop is used by rolling it against the free end of the part to indicate the part length measurement via an arm extending toward scale 30.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A fixture for measuring the length of long flexible extruded parts of different cross-sections, said parts being formed of foam rubber and the like material and being incapable of self-support in a straight line, comprising an elongated cradle including an upwardly open trough, a plurality of rollers having rims of like diameter arranged with said rims aligned seriatim in said trough to present a series of support surfaces arranged in a line, support shafts for said rollers extending through the axis of rotation of the corresponding rollers, said shafts extending parallel to each other and transversely of said trough and being spaced apart a distance slightly greater than the diameter of said rollers whereby the circumferential rim surfaces of said rollers facing upward in said cradle provide a part support of discontinued segments of said rollers extending at least the full length of the parts placed thereon, and localized tension and compression in the part will dissipate due to the part being supported independently at relatively closely spaced increments along the length of the part, a scale attached to and extending along said trough, an end stop at one end of said trough for indexing a part placed thereon, and a floating stop movable along said rollers into engagement with a free end of a part and cooperating with said scale to indicate the length of a part.

2. A fixture as defined in claim 1, further comprising said trough being formed by a beam having an upwardly open top, a bottom, and opposed sides, said rollers being supported in alignment along said beam from the bottom and sides thereof into at least three rows of aligned roller supports for confining an elongated flexible part therein.

3. A method of measuring length of long flexible extruded parts which are incapable of self-support in a straight line, comprising supporting the part in a substantially straight horizontal position at independent locations closely spaced lengthwise of the part, each support location being provided by a freely rotatable roller aligned along a cradle with the axes of the rollers parallel and each roller being independently movable with respect to adjacent rim surfaces of the part to allow the part to expand or contract locally due to release of tension or compression localized in the part, then measuring the length of the relaxed part.

* * * * *